United States Patent [19]
Johnston, Jr.

[11] 3,731,223
[45] May 1, 1973

[54] LASER APPARATUS FOR OPTICAL MODULATION TRANSFER

[75] Inventor: Wilbur Dexter Johnston, Jr., Holmdel, N.J.

[73] Assignee: Bell Telephone Laboratories, Incorporated, Murray Hill, N.J.

[22] Filed: Sept. 23, 1971

[21] Appl. No.: 183,076

[52] U.S. Cl. ................331/94.5, 250/199, 307/88.3
[51] Int. Cl............H01s 3/20, H01s 3/10, H01s 3/09
[58] Field of Search ......................331/94.5; 29/199; 307/88.3

[56] References Cited

UNITED STATES PATENTS 3,333,101  7/1962  Bell ......................................250/83.3

OTHER PUBLICATIONS

Kliot–Dashinski, Optics & Spectroscopy, vol. 26, no. 6, June, 1969, pp. 538–541

Kliot–Dashinski, Optics & Spectroscopy, vol. 29, no. 1, July, 1970, pp. 75–8.

Kliot–Dashinski, Soviet Physics–Tech. Physics, vol. 15, no. 7, January, 1971, pp. 1091–6.

*Primary Examiner*—Ronald L. Wibert
*Assistant Examiner*—R. J. Webster
*Attorney*—R. J. Guenther et al.

[57] ABSTRACT

There are disclosed arrangements for transferring optical information from one optical beam of a first frequency to another optical beam of a second frequency within a laser apparatus, particularly for the cases in which the laser transitions corresponding to the two frequencies are independent or very strongly competitive. The arrangements are based upon the use of a broadband gain medium, such as a dye laser medium, to modify the intensity relationship between two or more independent transitions or two or more competing transitions of a single laser medium.

6 Claims, 4 Drawing Figures

XENON LASER

LASER APPARATUS FOR OPTICAL MODULATION TRANSFER

BACKGROUND OF THE INVENTION

This invention relates to the transfer of information from one optical carrier of a first frequency to a second optical carrier of a second frequency.

While lasers have frequently been proposed as being useful for optical communication systems, one of the obstacles to practical systems of this type is the lack of an adequate variety of high performance devices, including sources, modulators, amplifiers and detectors at any one frequency. In order to take optimum advantage of the various high performance optical components now available for use in a communication system, it is desirable to be able to shift the frequency of the optical carrier at various points in the transmission system. Moreover, this frequency shifting should be achievable relatively efficiently in a relatively simple apparatus.

While various proposals for such frequency shifting have been made, nearly all of them are either highly inefficient or unduly complicated. For example, demodulation of the first optical carrier and use of the baseband signal to modulate a new optical carrier introduces problems both at the detection stage and at the remodulation stage which should be avoided. The complexity of such a system is objectionable. Other schemes which do not involve demodulation, such as parametric mixing or the use of two photon absorption, as disclosed in the copending patent application of H. P. Weber, Ser. No. 142,680, filed May 12, 1971, and assigned to the assignee hereof, are relatively inefficient and seem impractical for many commercial applications.

SUMMARY OF THE INVENTION

According to my invention, I provide the desired modulation transfer, or optical frequency shifting of the optical carrier, in an apparatus in which a first laser active medium amplifier an input modulated beam via a first one of two radiative transitions in said medium. The amplified beam then pumps a dye laser medium which couples the two transitions to produce oscillations at the frequency of the second transition because of optical feedback from the second medium to the first medium.

The coupling provided by the second laser medium, specifically the dye laser medium, permits the use of a wide variety of materials as the first laser medium. In fact, the dye laser medium can couple the transitions with a strength providing a substantial degree of modulation transfer.

According to a subsidiary feature of my invention, the modulated first optical carrier is coupled into the apparatus through an isolator or a three-port optical circulator, the latter arrangement having the advantage that an amplified beam at the first frequency can be obtained from one of the circulator parts while the frequency shifted carrier can be extracted either from another part of the laser apparatus or, if desired, collinearly with the amplified beam at the first frequency.

BRIEF DESCRIPTION OF THE DRAWING

Further features and advantages of my invention will become apparent from the following detailed description, taken together with the drawing, in which.

DESCRIPTION OF ILLUSTRATIVE EMBODIMENTS

Figure 1:
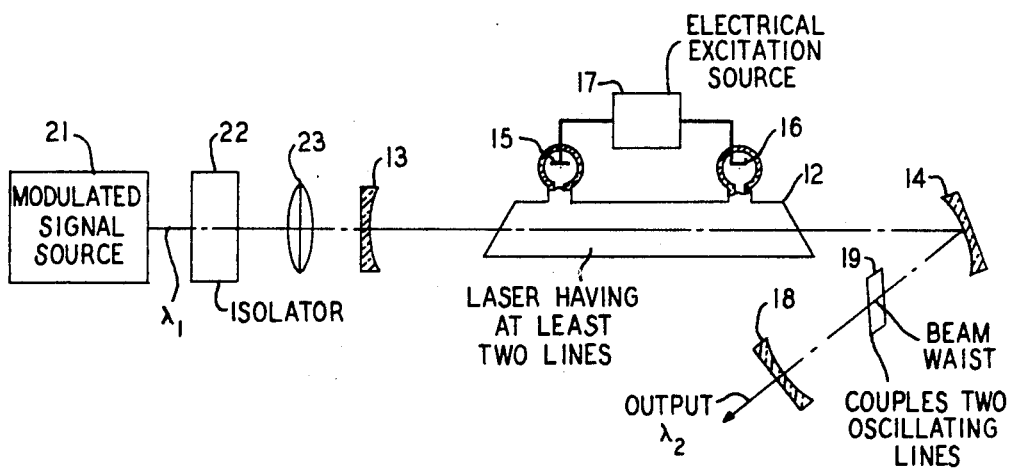
FIG. 1 is a partially pictorial and partially block diagrammatic illustration of a first embodiment of my invention.

The specific embodiments of my invention can best be understood with the following background information. The majority of laser gain media other than semiconductor compounds are capable of providing laser action at several different wavelengths, when placed in an appropriate optical cavity and excited appropriately for the desired wavelength. For some of these transitions in certain media, simultaneous laser operation is possible on two or more wavelengths; that is, the "appropriate" optical cavity and excitation conditions mentioned are not mutually exclusive. Two such transitions in a gain medium are said to be independent, if they share neither upper nor lower laser level; in cascade, if the upper level of the one is the lower level of the other; or in competition, if they share the same upper level or the same lower level.

The light output at different wavelengths is unrelated, if the transitions are independent. That is, suppressing the output at one wavelength by external means, such as introducing wavelength-selective absorption into the cavity, does not affect the light output at the other wavelength. If the transitions are in cascade, the light outputs at the different wavelengths vary together, so that oscillation on one transition increases the gain and thus tends to increase the light output at the other transition. When two transitions are in competition, simultaneous operation is unstable and one or the other will dominate completely in the light output.

The introduction of an organic dye solution into the optical cavity provides a mechanism by which the nature of the transition coupling may be modified. Thus, if we have two simultaneously oscillating independent transitions, they may be coupled by choosing a dye which absorbs at the shorter wavelength and fluoresces at the longer wavelength, and which has such other qualities (which are well known from dye laser technology) as will result in gain at the longer wavelength. Thus, in this example, the shorter wavelength transition experiences less, and longer wavelength greater, gain than when the dye is not present. With an appropriate dye density, and with appropriate adjustment of optical spot size in the dye cavity, gain is thus "switched" from the shorter to the longer wavelength transition. With regard to coupling, they appear to be partially in cascade, in that suppression (enhancement) of the shorter wavelength oscillation reduces (increases) the gain for the longer wavelength. There is no reverse coupling. That is, there is no effect on the shorter wavelength by suppression or enhancement of the longer wavelength, although there would be an effect in true cascade.

As another example, if we have two transitions which compete strongly for gain but which could oscillate simultaneously were it not for the competitive coupling, the competition can be reduced from an "all one or all the other" case to a case in which a variable finite ratio of light output may be obtained. This reduction in competition is accomplished by selecting the optical cavity so that oscillation is obtained on the shorter wavelength transition in the absence of the dye. When the dye is added, again with appropriate density and in a position in the cavity with appropriate optical spot size, gain is again "switched" from the short wavelength transition to the long wavelength transition, bringing it above threshold. It cannot now extinguish the short wavelength oscillation, however, since the additional gain "switched" to the long wavelength transition is proportional to the power in the cavity at the short wavelength transition. The ratio at equilibrium may be adjusted by varying the total excitation, dye density, spot size in the dye cell, and initial absorptive or transmissive discrimination (if any) against the longer wavelength or in favor of the shorter.

The embodiment of FIG. 1 provides modulation transfer from the carrier frequency of the modulated signal source 21 to a second carrier frequency, a portion of which can be extracted through the end mirror 18 of the laser apparatus. This apparatus illustratively couples two independent oscillations, which can also be referred to as radiative transitions or "lines" of the xenon laser 12. The laser 12 is disposed in a folded optical resonator including the back mirror 13 which is highly reflective at $\lambda_2$ and 90 percent reflective at $\lambda_1$, the highly reflective broad band oblique-incidence mirror 14 and the output mirror 18 which is 90 percent reflective at $\lambda_2$ and highly reflective at $\lambda_1$. Specifically, $\lambda_1$ is 5,352 Angstrom units and $\lambda_2$ is 5,956 Angstrom units; these wavelengths are the wavelengths of two independent laser transitions in the xenon laser 12 when subjected to a direct current discharge from a source 17 connected between anode 15 and cathode 16.

Also disposed in the folded optical resonator is the dye cell 19, which has Brewster-angle entrance and exit surfaces forming the Brewster angles in the same plane as the plane of the folded optical resonator. The astigmatism of these Brewster-angle surfaces of dye cell 19 is partially compensated by the choice of angle between the axes of the two sections of the folded optical resonator, as taught in the copending application of A. Dienes et al., (Case 3-5-21-6) Ser. No. 154,087, filed June 17, 1971, and assigned to the assignee hereof.

The dye cell 19 illustratively includes rhodamine 6G dye in a methanol solution. The particular degree of coupling of the laser transitions could be modified by mixing the rhodamine 6G dye with other dyes such as rhodamine B or by using other appropriate dyes.

Further details of the embodiment of FIG. 1 are as follows:

The reflectivity and radii of mirrors 13, 14 and 18 are selected to provide oscillation of the laser 12 at 5,352 Angstrom units, as well as substantial reflectivity at 5,956 Angstrom units, a wavelength of oscillation available in a xenon laser. The radii of reflectors 14 and 18 provide the waist of the beams in the center of dye cell 19, through which the dye is flowed to avoid bleaching and damaging effects.

The xenon discharge tube 12, in some of my preliminary experiments, was pulsed electrically so that optical pulses of about 250 nanoseconds duration were obtained 10–20 times per second. Nevertheless, these parameters are not believed to be critical. Pairs of continuous-wave lines are available in other suitable lasers.

The operation of the embodiment of FIG. 1 can be understood as follows: The dependence of the gain on total gas pressure in tube 12 for the 5,352 Angstrom and 5,956 Angstrom transitions in tube 12 is illustrated by curves 41 and 42, respectively, of FIG. 4, in the absence of dye cell 19. Note that there are regions of curves 41 and 42 that indicate that either transition will oscillate alone, specifically, to the left and right of the region of overlap, and a region of overlap where independent oscillations on both transitions occur simultaneously. If the pressure is adjusted to the operating point on curve 41 having pressure $P_o$, the 5,352 Angstrom line is oscillating strongly and the 5,956 Angstrom line is somewhat below threshold. Next, the concentration of the dye in cell 19 is gradually increased until the 5,956 Angstrom unit transition is brought above threshold and its coherent radiation is "turned on." Concurrently, the power at 5,352 Angstrom units decreases. A dye concentration of the rhodamine 6G corresponding to one-way absorptive loss of 17 percent at 5,352 Angstrom units was found to be optimum to maximize the output at 5,956 Angstroms for the particular arrangement of FIG. 1 having the gains and losses present in my early embodiment.

The dye cell 19 acts to put the two independent transitions of laser 12 effectively in cascade; that is, if the intensity of the beam at the frequency of the first optical carrier varies, the intensity of the beam at the second optical frequency will similarly vary. In order for a linear modulation transfer to be achieved, the reflector transmissivities and the dye concentration in cell 19 are adjusted so that the longer wavelength oscillation is just above threshold and the shorter wavelength oscillation is simultaneously just above the threshold and continuing to oscillate without any signal from modulated signal source 21.

Now let us recall that reflector 18 is totally reflecting for the shorter wavelength $\lambda_1$ oscillation; and reflector 13 is totally reflecting for the longer wavelength $\lambda_2$ oscillation. Reflector 18 is partially transmissive at $\lambda_2$ to couple a portion of the frequency-shifted modulated optical beam out for utilization; and reflector 13 is partially transmissive for the shorter wavelength $\lambda_1$ oscillation, since it is necessary to couple in to the laser apparatus the original modulated beam at wavelength $\lambda_1$.

Specifically, the optical modulated carrier at wavelength $\lambda_1$ is coupled into the laser resonator through an isolator 22 and the lens 23, under conditions insuring that the oscillation in the resonator formed by reflectors 13, 14 and 18 at wavelength $\lambda_1$ is locked to the input signal at wavelength $\lambda_1$. This locking may be a phase lock for modulation including phase modulation, although pure phase modulation cannot be transferred by this scheme. The locking may be an amplitude lock for an amplitude modulation or even a spatial lock to the oscillation as described in U.S. Pat. No. 3,576,502, issued Apr. 27, 1971. By virtue of the dye coupling, the gain at wavelength $\lambda_2$ is modulated in time and space in proportion to the signal at $\lambda_1$; and thus the output beam at wavelength $\lambda_2$ is also modulated in proportion to the signal at $\lambda_1$.

The foregoing scheme is obviously generalizable to other transitions in xenon or other gas discharges and to other types of gain media such as crystalline or liquid materials. It is only necessary that the shorter wavelength transition lie within the absorption (or pump band) of the second laser medium, i.e., that of cell 19, and that the longer wavelength transition of the first laser medium lie within the gain bandwidth of the second laser medium. This fact can be appreciated from a perusal of the curves of FIG. 4, as explained above.

It should be stated here that the embodiment of FIG. 1 will also work when the laser 12 is a laser that provides strong competition of the two transitions such as occurs in a neodymium laser at wavelengths of $\lambda = 1.06$ and 1.3 micrometers. In this case, the second laser medium, i.e., cell 19, shifts gain from the first transition to the second transition and prevents the vigorous competition between the two transitions from extinguishing the second, and usually weaker, transition. It will be appreciated that without the dye cell 19, only one of the other transition will oscillate, since oscillation on the one transition reduces the gain for the other. Nevertheless, with the dye, the competitive coupling can be reduced to a level at which both transitions are allowed to oscillate simultaneously.

Since an antiphase modulation would normally be expected for such a modified embodiment, the laser apparatus would normally be adjusted so that the longer wavelength $\lambda_2$ transition is oscillating strongly in the absence of the input signal; but the shorter wavelength transition is also oscillating at least weakly. In fact, an injected signal at either $\lambda_1$ or $\lambda_2$ will produce an antiphase modulation of the output at the other wavelength.

Figure 2:
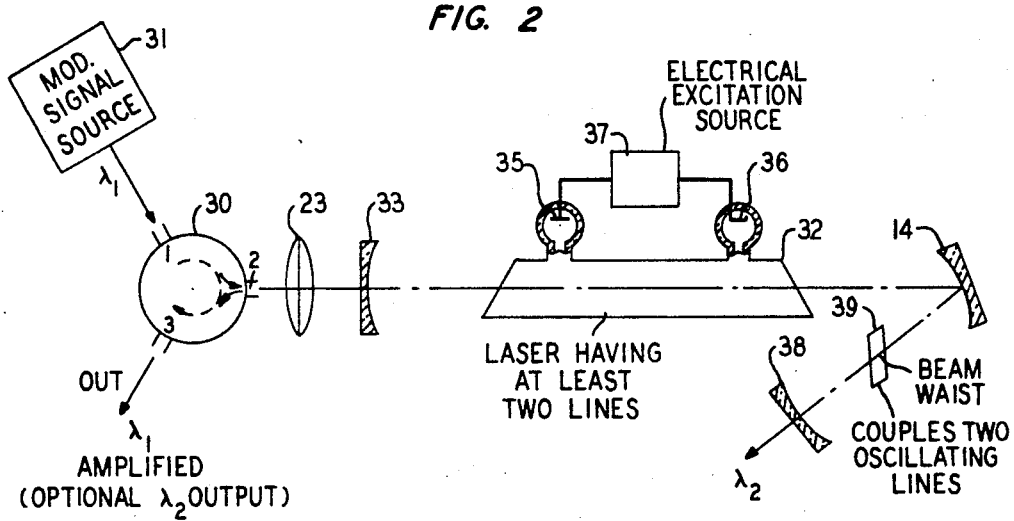
FIG. 2 is an illustration of a modification of the embodiment of FIG. 1 employing a three-port optical circulator.

In order to obtain an output at either the longer or the shorter wavelength, isolator 22 of FIG. 1 should be replaced by the three-port optical circulator 30, shown in FIG. 2. All of the other components of FIG. 1 are similar to the analogous components of FIG. 1 with the exception of the initial adjustment of the $\lambda_2$ oscillation and the presence of strong competition between the two transitions in the absence of dye cell 39.

The three-port optical circulator 30 is of known type, such as disclosed in U.S. Pat. No. 3,267,804, issued Aug. 23, 1966 to J. F. Dillon, Jr. It will transfer the $\lambda_1$ signal from port 1 to port 2 when the signal is traveling clockwise from port 1 to port 2 and will transmit a signal at $\lambda_1$ from port 2 to port 3 when that signal enters port 2 upon returning from the laser resonator and lens 23. The amplified signal at wavelength $\lambda_1$ is extracted from port 3. Optionally, the signal at $\lambda_2$ can also be extracted from port 3, if desired for some applications. For this purpose, mirror 33 would be selected to be partially transmissive at $\lambda_2$, instead of mirror 38. Mirror 38 would then be made highly reflective at $\lambda_2$, as well as at $\lambda_1$.

Even for some other laser system in which cascaded transitions exist, the use of the additional gain medium 19 or 39 provides a mechanism for increasing the efficiency of the in-phase transfer of modulation for an injected signal at $\lambda_1$, since the gain at $\lambda_2$ is being increased not only by virtue of the cascade, but also by the dye gain. Since the transfer characteristics of the cascade coupling are determined by the various radiative and nonradiative lifetimes of the upper, common, and lower cascade levels, which are not susceptible to independent adjustment for optimization, the second gain medium provides an adjusting mechanism for optimizing the particular modulation transfer desired.

The advantages of an organic dye as compared to other second gain media in this system reside in its broadband-absorption and broad gain bandwidth.

Figure 4:
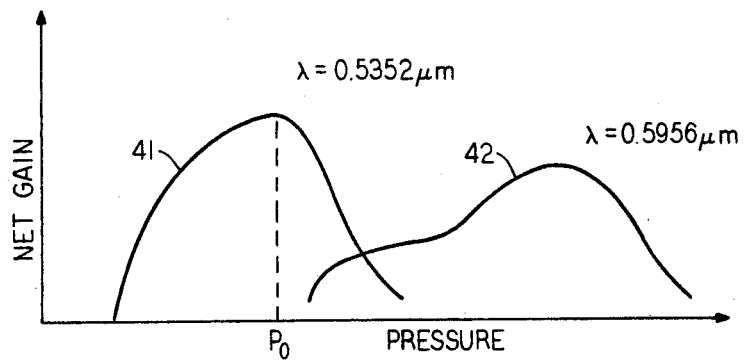
FIG. 4 shows curves useful in explaining the operation of the embodiments of FIGS. 1 through 3.

It should, of course, be understood that a variety of organic dyes are available which will provide the absorption band and emission band similar in shape to those shown by curves 41 and 42 of FIG. 4 but matched in wavelength to the transitions of the lasers 12 or 32.

Figure 3:
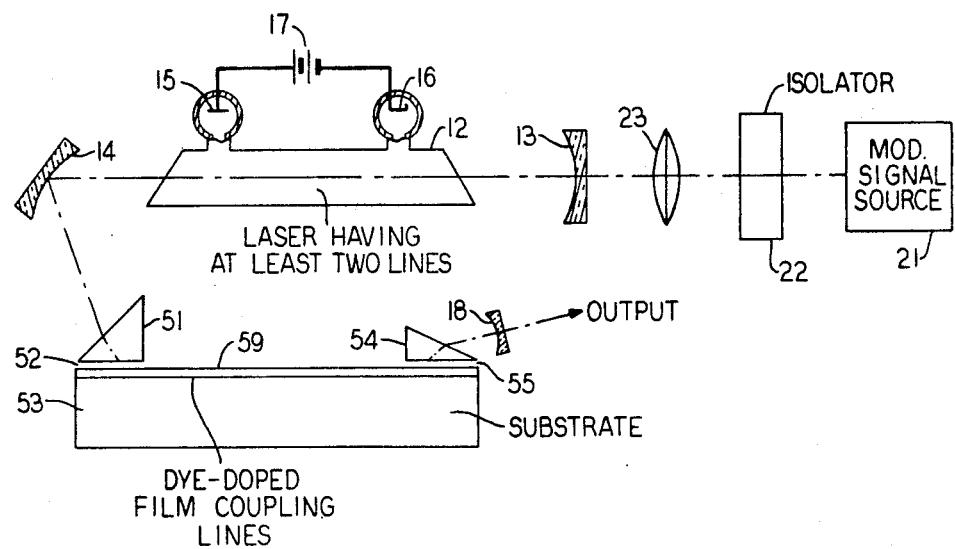
FIG. 3 is an illustration of a further modification of the embodiment of FIG. 1 employing a broadband active thin film.

In the embodiment of FIG. 3 all components labeled the same as in FIG. 1 are essentially the same as in the embodiment of FIG. 1. The principal differences from the embodiment of FIG. 1 are that the dye cell 19 has been replaced by the thin film assembly, including prisms 51 and 54, substrate 53 and thin film 59.

Illustratively, the substrate 53 is a low index (1.47) PYREX glass and the film 59 is a polyethylene film, index 1.55, doped with rhodamine 6G such as was used in the embodiment of FIG. 1. The film may be applied in liquid form to substrate 53 by dipping, spraying or painting. The input and output coupling are provided by the prisms 51 and 54, which are separated from film 59 by a small gap 52, as taught by P. K. Tien in U.S. Pat. No. 3,584,230, issued June 8, 1971. A substantial gain in light intensity in the thin film is achieved so that the dye concentration need not be as great as in cell 19 of FIG. 1, better cooling is obtained so that the rate of destruction of the dye is lower and, in addition, the focusing requirements are substantially reduced. It will be noted that output mirror 18 closes an optical oscillator which extends through the prisms 51 and 54 and the intervening portion of thin film 59. As damage of the dye in thin film 59 occurs, it is merely necessary to displace the thin film 54 laterally under the prisms so that the oscillation path passes through a fresh portion of the dye.

I claim:

1. Apparatus comprising a first laser active medium, means for pumping said medium to invert the populations of two transitions of said medium, means for admitting to said first laser active medium an input modulated beam of a first frequency matching the frequency of radiation from a first one of said transitions, a second laser active medium disposed to be buffered by said first medium from said input beam and to intercept radiation from said first active medium, said second medium absorbing radiation at said first frequency to produce population inversion yielding laser gain over a band of frequencies including the frequency of radiation of the second transition, and means including an optical resonator disposed about both said first and second media for providing optical feedback from said second medium to said first medium and stimulated emission of radiation on at least one of said transitions from at least said first medium, said first and second media together emitting radiation at said first and second frequencies with intensities having respective one-to-one correspondences to the intensity of the input beam, said apparatus thereby providing a substantial degree of modulation transfer to radiation at said second frequency.

2. A laser according to claim 1 in which the two transitions of the first laser active medium are independent transitions, and the second laser active medium has an absorption for a portion of the radiation of the shorter wavelength transition and provides gain for the longer wavelength transition to couple said two transitions to a degree causing both transitions to oscillate near threshold in the absence of an input signal.

3. A laser according to claim 1 in which the two transitions of the first laser active medium are competing transitions, said resonator favoring relatively strong oscillations of the second transition, the second laser active medium being effective to yield a stable antiphase modulation of an output beam of the frequency of the second transition in response to the admitted input modulated beam at the first frequency.

4. A laser according to claim 1 in which the admitting means includes an optical isolator to prevent the admitted input beam from propagating in reverse therethrough.

5. A laser according to claim 1 including an optical circulator having one port from which an amplified beam at the first frequency can be obtained.

6. A laser according to claim 5 in which the resonator includes a reflector disposed between the optical circulator and the first medium, said reflector being partially transmissive at both of the first and second frequencies to permit the extraction of modulated radiation at the second frequency from the one port collinearly with the amplified beam at the first frequency.

* * * * *